United States Patent
Hattori et al.

(10) Patent No.: US 10,122,237 B2
(45) Date of Patent: Nov. 6, 2018

(54) INVERTER CIRCUIT BOARD AND INVERTER-CONTAINING ELECTRIC COMPRESSOR USING SAME

(71) Applicant: MITSUBISHI HEAVY INDUSTRIES THERMAL SYSTEMS, LTD., Minato-ku, Tokyo (JP)

(72) Inventors: Makoto Hattori, Kiyosu (JP); Masahiko Asai, Kiyosu (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 514 days.

(21) Appl. No.: 14/765,267

(22) PCT Filed: Feb. 7, 2014

(86) PCT No.: PCT/JP2014/052857
§ 371 (c)(1),
(2) Date: Jul. 31, 2015

(87) PCT Pub. No.: WO2014/136524
PCT Pub. Date: Sep. 12, 2014

(65) Prior Publication Data
US 2015/0372559 A1 Dec. 24, 2015

(30) Foreign Application Priority Data
Mar. 7, 2013 (JP) .................................. 2013-045360

(51) Int. Cl.
*H02K 5/22* (2006.01)
*H02K 11/02* (2016.01)
(Continued)

(52) U.S. Cl.
CPC ............. *H02K 5/225* (2013.01); *F01C 21/10* (2013.01); *F04B 35/04* (2013.01); *F04B 39/121* (2013.01);
(Continued)

(58) Field of Classification Search
CPC ........ F04B 35/04; F04B 39/121; F01C 21/10; H02K 5/225; H02K 11/024; F04C 2240/808; F04C 2240/803; H02M 7/003
(Continued)

(56) References Cited

U.S. PATENT DOCUMENTS 4,885,629 A * 12/1989 Takagi ................. H01L 25/072
257/690
5,430,326 A 7/1995 Miyashita
(Continued)

FOREIGN PATENT DOCUMENTS

CN 101187364 A 5/2008
CN 101208854 A 6/2008
(Continued)

OTHER PUBLICATIONS

Chinese Office Action dated Dec. 2, 2016 in corresponding Chinese Patent Application No. 201480006804.0 with an English Translation.

*Primary Examiner* — Anatoly Vortman
(74) *Attorney, Agent, or Firm* — Birch, Stewart, Kolasch & Birch, LLP

(57) ABSTRACT

An inverter circuit board to which a P-N terminal is attached such that stress applied to the circuit board can be distributed, making it possible to prevent detachment of the P-N terminal or damage to the circuit board or any components mounted thereon. Also provided is an inverter-containing electric compressor. A P-N terminal via which DC power is inputted is attached to this inverter circuit board, on which (Continued)

an inverter circuit is mounted. The P-N terminal is provided with the following: a pair of pins; a busbar of a prescribed length joined perpendicularly to one end of each pin; a resin molded member formed integrally with the pair of pins and the busbars; and surface-mounting terminals, soldered to the surface of the circuit board, and through-hole terminals, inserted into and soldered to through-holes in the circuit board, said terminals being provided on the pair of busbars.

6 Claims, 10 Drawing Sheets

(51) Int. Cl.
  F04B 35/04 (2006.01)
  F04B 39/12 (2006.01)
  F01C 21/10 (2006.01)
  H02M 7/00 (2006.01)
(52) U.S. Cl.
  CPC ...... H02K 11/024 (2013.01); *F04C 2240/803* (2013.01); *F04C 2240/808* (2013.01); *H02M 7/003* (2013.01)
(58) Field of Classification Search
  USPC .......................................................... 361/720
  See application file for complete search history.

(56) References Cited

U.S. PATENT DOCUMENTS

| | | | | |
|---|---|---|---|---|
| 6,954,368 | B1* | 10/2005 | Francoeur | H02M 7/003 361/763 |
| 7,019,987 | B2* | 3/2006 | Onoe | H02J 1/102 363/17 |
| 8,007,255 | B2* | 8/2011 | Hattori | B60H 1/3223 310/55 |
| 8,441,160 | B2* | 5/2013 | Watanabe | F04B 39/121 310/51 |
| 8,785,777 | B2* | 7/2014 | Yasukawa | B29C 45/14065 174/68.2 |
| 9,722,474 | B2* | 8/2017 | Hattori | H02K 5/225 |
| 9,735,644 | B2* | 8/2017 | Hattori | H02K 5/225 |
| 2004/0145860 | A1* | 7/2004 | Shindo | B60R 16/0239 361/622 |
| 2006/0230781 | A1* | 10/2006 | Kawada | F04B 35/04 62/498 |
| 2008/0266811 | A1 | 10/2008 | Yamada et al. | |
| 2009/0096301 | A1* | 4/2009 | Sumi | H02K 11/33 310/89 |
| 2009/0246047 | A1* | 10/2009 | Hattori | H02K 11/01 417/410.1 |
| 2010/0018243 | A1* | 1/2010 | Tanaka | F04B 39/121 62/508 |
| 2010/0303648 | A1* | 12/2010 | Watanabe | F04B 39/121 417/411 |
| 2010/0320880 | A1* | 12/2010 | Kamogi | H02K 11/33 310/68 B |
| 2011/0163705 | A1* | 7/2011 | Sato | H02K 11/0073 318/400.24 |
| 2011/0187213 | A1* | 8/2011 | Kitagawa | H02K 5/225 310/71 |
| 2011/0236235 | A1* | 9/2011 | Hattori | B60H 1/00428 417/410.1 |
| 2011/0285226 | A1* | 11/2011 | Fujita | H01L 23/49562 310/71 |
| 2012/0160596 | A1* | 6/2012 | Yamasaki | B62D 5/0406 180/443 |
| 2012/0237376 | A1* | 9/2012 | Kinoshita | F01C 21/10 417/423.7 |
| 2013/0033914 | A1* | 2/2013 | Yahata | H02M 7/48 363/132 |
| 2013/0049550 | A1* | 2/2013 | Watanabe | F04B 39/121 310/67 R |

FOREIGN PATENT DOCUMENTS

| | | |
|---|---|---|
| CN | 101705847 A | 5/2010 |
| CN | 202713185 U | 1/2013 |
| EP | 1 034 983 A2 | 9/2000 |
| JP | 6-13539 A | 1/1994 |
| JP | 11-135965 A | 5/1999 |
| JP | 2000-261160 A | 9/2000 |
| JP | 2011-187691 A | 9/2011 |
| JP | 2012-70543 A | 4/2012 |
| JP | 2012-112274 A | 6/2012 |
| JP | 2012-193660 A | 10/2012 |
| JP | 2012-209414 A | 10/2012 |

* cited by examiner

INVERTER CIRCUIT BOARD AND INVERTER-CONTAINING ELECTRIC COMPRESSOR USING SAME

TECHNICAL FIELD

The present invention relates to a favorable inverter circuit board for application to an inverter device for use in an electric compressor and to an inverter-containing electric compressor which integrally incorporates an inverter device using the same.

BACKGROUND ART

Inverter-containing electric compressors, which integrally incorporate inverter devices, are used as air conditioner compressors installed in electric vehicles, hybrid vehicles, and the like. This inverter-containing electric compressor is configured so that high-voltage direct current (DC) power supplied from a power supply unit installed in a vehicle is converted by an inverter device to three-phase alternating current (AC) power of a required frequency, which is then applied to the electric motor so that the electric motor is driven.

The inverter device is provided with a plurality of high-voltage electrical components such as a coil or a condenser constituting a filter circuit for noise removal, a plurality of semiconductor switching elements such as IGBTs constituting a switching circuit for converting electric power, and inverter circuit board or the like on which an inverter circuit including a filter circuit and a switching circuit, or a control circuit thereof (hereinafter, referred to simply as an inverter circuit), is mounted. The inverter device is configured to convert DC power inputted via a P-N terminal to three-phase AC power and output the AC power from a UWV terminal, and is integrated by being incorporated in an inverter housing section provided at the outer periphery of the housing of the electric compressor.

Regarding such inverter devices, Patent Document 1 discloses an inverter device where a power input port forming section is formed in an inverter cover made of metal which seals an inverter housing space in which an inverter circuit board on which a coil and a condenser for a filter circuit or switching elements for a switching circuit are mounted is attached, a power connector made of resin being integrally provided therewith by resin insert molding a metal terminal in the port forming section, a power cable being connected with the power connector, and the metal terminals of the resin power connector being electrically connected with the inverter circuit board side by attaching the inverter cover to the housing.

CITATION LIST

Patent Literature

Patent Document 1: Japanese Unexamined Patent Application Publication No. 2012-193660A

SUMMARY OF INVENTION

Technical Problem

In the inverter device disclosed in Patent Document 1 described above, a coil, a condenser, switching elements, or the like are mounted on an inverter circuit board, power connectors made of resin which connect a power cable with an inverter cover are integrally provided therewith, and the metal terminals of the connectors are electrically connected with connectors or the like on the inverter circuit board side when attaching the inverter cover. The inverter device is able to simplify the configuration of a DC power input system. However, in a case of electrically connecting and disconnecting a power cable and an inverter circuit board, it is necessary to connect or disconnect terminals and connectors and there is a problem in that great stress is applied to the terminals, connectors, or the circuit board itself and there are concerns such as that the terminals and connectors will be peeled apart or the circuit board or any components mounted thereon will be damaged due to this stress.

The present invention has been made in consideration of the circumstances described above and an object of the present invention is to provide an inverter circuit board where a P-N terminal is attached firmly on the circuit board and attached such that stress applied to the circuit board can be distributed, making it possible to prevent detachment of the P-N terminal or damage to the circuit board or any components mounted thereon, and an inverter-containing electric compressor using the inverter circuit board.

Solution to Problem

The inverter circuit board and the inverter-containing electric compressor using the inverter circuit board of the present invention adopt the following means in order to solve the problems described above.

An inverter circuit board according to a first aspect of the present invention includes a circuit board, an inverter circuit mounted on the circuit board, a P-N terminal via which high-voltage DC power is inputted attached to the circuit board, and a connector on a power cable side directly connected to the P-N terminal so as to be able to be freely attached and detached; the P-N terminal being provided with a pair of pins, a busbar of a prescribed length joined perpendicularly to one end of each pin, a resin molded member formed integrally with the pair of pins and the busbars, and through-hole terminals inserted into and soldered to through-holes in the circuit board, and surface-mounting terminals soldered to the surface of the circuit board, the terminals being provided on the pair of busbars; the through-hole terminals and surface-mounting terminals being attached on the circuit board by being soldered at the circuit board side.

According to the first aspect of the present invention, a P-N terminal which is attached onto a circuit board is provided with a pair of pins, busbars of a prescribed length joined perpendicularly to one end of each pin, a resin molded member formed integrally with the pair of pins and the busbars, and through-hole terminals inserted into and soldered to through-holes in the circuit board, and surface-mounting terminals soldered to the surface of the circuit board, the terminals being provided on the pair of busbars, and the surface-mounting terminals and through-hole terminals being attached onto the circuit board by being soldered at the circuit board side. Thus, it is possible to solder the pair of busbars of the P-N terminal onto the resin molded member and the circuit board via the through-hole terminals and the surface-mounting terminals, to be firmly fixed and attached thereto. Accordingly, even in a case of a configuration where a connector is directly connected with the power cable side by insertion into the P-N terminal, it is possible to stably hold the P-N terminal on the circuit board and to smoothly insert the connector, and it is possible to secure a sufficient tensile strength with respect to the disconnecting force and to prevent the P-N terminal from being detached even when detaching the power source cable by disconnecting the connector from the P-N terminal during maintenance. In addition, it is possible to secure a sufficient current density with respect to the input of high voltages by soldering the P-N terminal at each of two places.

Furthermore, regarding the inverter circuit board of the first aspect of the present invention, the through-hole terminals may be provided at positions as far as possible from each of the pins and the surface-mounting terminals may be provided at positions close to each of the pins in the inverter circuit board described above.

By doing so, since the through-hole terminals are provided at positions as far as possible from each of the pins and the surface-mounting terminals are provided at positions close to each of the pins, the soldering of the P-N terminal with respect to the inverter circuit board can be performed at two places, which are the positions as far as possible sufficiently separated from the pair of pins and the positions close to each of the pins. Thus, it is possible to distribute the stress applied to the inverter circuit board side within as wide a range as possible when attaching and detaching the connector of the power source cable with respect to P-N terminal. Accordingly, not only is it possible to attach the P-N terminal while securing strength sufficient to withstand the force applied when inserting or removing the connector, but it is also possible to reduce the stress applied to the inverter circuit board and carry out the attachment in a state where the stability of the posture is maintained.

Furthermore, in the inverter circuit board of the first aspect of the present invention, the pins and the busbars in any one of the inverter circuit boards described above may be resistance-welded using protrusions and a plurality of projections which are fitted in holes on the side of the busbars provided on one end surface of the pins.

By doing so, since the pins and the busbars are resistance-welded using protrusions and a plurality of projections which are fitted in holes on the side of the busbars provided on one end surface of the pins, it is possible for each of the pins to be integrated with respect to each of the busbars by resistance-welding using the protrusions and the plurality of projections in a state where the protrusions of each of the pins are aligned to fit into the holes on the side of each of the busbars. Accordingly, each of the pins is welded with high precision at a right angle to each of the busbars, and it is possible to facilitate the attachment and detachment of the connector by increasing the precision in the P-N terminal.

Furthermore, in an inverter-containing electric compressor according to a second aspect of the present invention, an inverter-containing electric compressor integrated with an inverter device incorporated in an inverter housing section which is provided at a periphery of a housing includes the inverter device provided with any one of the inverter circuit boards described above, and a power source cable able to be connected by inserting a connector, which is provided at one end of the power source cable which supplies DC power to the inverter device, into the P-N terminal which is provided on the inverter circuit board.

According to the second aspect of the present invention, an inverter-containing electric compressor which is integrated by an inverter device being incorporated in an inverter housing section which is provided in a housing includes the inverter device provided with any one of the inverter circuit boards described above, and a power source cable able to be connected by inserting a connector, which is provided at one end of the power source cable which supplies DC power to the inverter device, into the P-N terminal which is attached on the inverter circuit board. Thus, it is possible to directly connect the power source cable to the inverter circuit board by inserting the connector of the power source cable into the P-N terminal fixed and attached to the inverter circuit board. Even with this configuration, it is possible to facilitate the connection and disconnection of the power source cable by plugging in or withdrawing the connector since the P-N terminal is firmly fixed and attached. Accordingly, it is possible to facilitate the attachment and detachment of the power source cable during maintenance and it is possible to simplify the configuration of the input system of the inverter device, and to lower the costs and reduce the size and weight of the inverter device.

Furthermore, in the inverter-containing electric compressor of the second aspect of the present invention, a coil and a condenser which constitute a filter circuit for removing noise may be mounted on the inverter circuit board in the inverter-containing electric compressor described above, and either one of the coil and condenser may be configured to receive stress, which is applied to the inverter circuit board when the connector is inserted, by being attached to the rear surface side to correspond to an attachment position of the P-N terminal provided on the inverter circuit board.

By doing so, since a coil and a condenser which constitute a filter circuit for removing noise are mounted on the inverter circuit board, and either one is configured to receive stress, which is applied to the inverter circuit board when the connector is inserted, by being attached to the rear surface side to correspond to an attachment position of the P-N terminal provided on the inverter circuit board, even in a case of a configuration where the power source cable is directly connected by inserting a connector provided at one end of the power source cable into the P-N terminal on the inverter circuit board, it is possible to reduce stress applied to the inverter circuit board when inserting the connector by the coil or the condenser arranged on the rear surface side of the P-N terminal with the inverter circuit board therebetween receiving the stress. Accordingly, it is possible to reliably eliminate situations where the inverter circuit board or any components mounted thereon are damaged by the stress caused by an excessive pushing force when inserting the connector. In addition, it is possible to simplify the configuration of the DC power input system, and to lower the costs and reduce the size and weight of the inverter device.

Furthermore, in the inverter-containing electric compressor of the second aspect of the present invention, the connector provided on one end of the power source cable may be provided at a position which corresponds to the P-N terminal on a side of a cover which seals the inverter housing section, and may be configured to be able to be inserted into the P-N terminal when attaching the cover.

By doing so, since the connector provided on one end of the power source cable is provided at a position which corresponds to the P-N terminal on a side of a cover which seals the inverter housing section, and is configured to be able to be inserted into the P-N terminal when attaching the cover, it is possible to connect the power source cable to the P-N terminal of the inverter device by inserting the connector attached to the inner surface of the cover into the P-N terminal at the same time as when sealing the inverter housing section by attaching a cover after housing and attaching the inverter device. Accordingly, it is possible to simplify the connection structure and the connection process of the power source cable, and it is possible to reliably insert the connector into the P-N terminal without applying excessive stress to the inverter circuit board even when the connector is fitted by pushing the cover with a somewhat excessive force.

Advantageous Effects of Invention

According to the inverter circuit board of the present invention, since it is possible to solder and firmly fix and attach the pair of busbars of the P-N terminal onto the circuit board along with a resin molded member via through-hole terminals and surface-mounting terminals, even in a case of a configuration where the power source cable is directly connected by inserting the connector into the P-N terminal, it is possible to stably hold the P-N terminal on the circuit board and to smoothly insert the connector, and it is possible to secure a sufficient pulling strength with respect to the disconnection force and to prevent the P-N terminal from being detached during maintenance when detaching the power source cable by disconnecting the connector from the P-N terminal. In addition, it is possible to secure a sufficient current density with respect to the input of high voltages by soldering the P-N terminal at each of two places.

In addition, according to the inverter-containing electric compressor of the present invention, it is possible to directly connect the power source cable to the inverter circuit board by inserting the connector of the power source cable into the P-N terminal fixed and attached on the inverter circuit board. Even in the case of this configuration, it is possible to easily connect and disconnect the power source cable by plugging in or withdrawing the connector since the P-N terminal is firmly fixed and attached. Accordingly, it is possible to facilitate the attachment and detachment of the power source cable during maintenance and it is possible to simplify the configuration of the input system of the inverter device, and to lower the costs and reduce the size and weight of the inverter device.

DESCRIPTION OF EMBODIMENTS

An embodiment of the present invention will be described below with reference to FIGS. 1 to 10.

Figure 1:
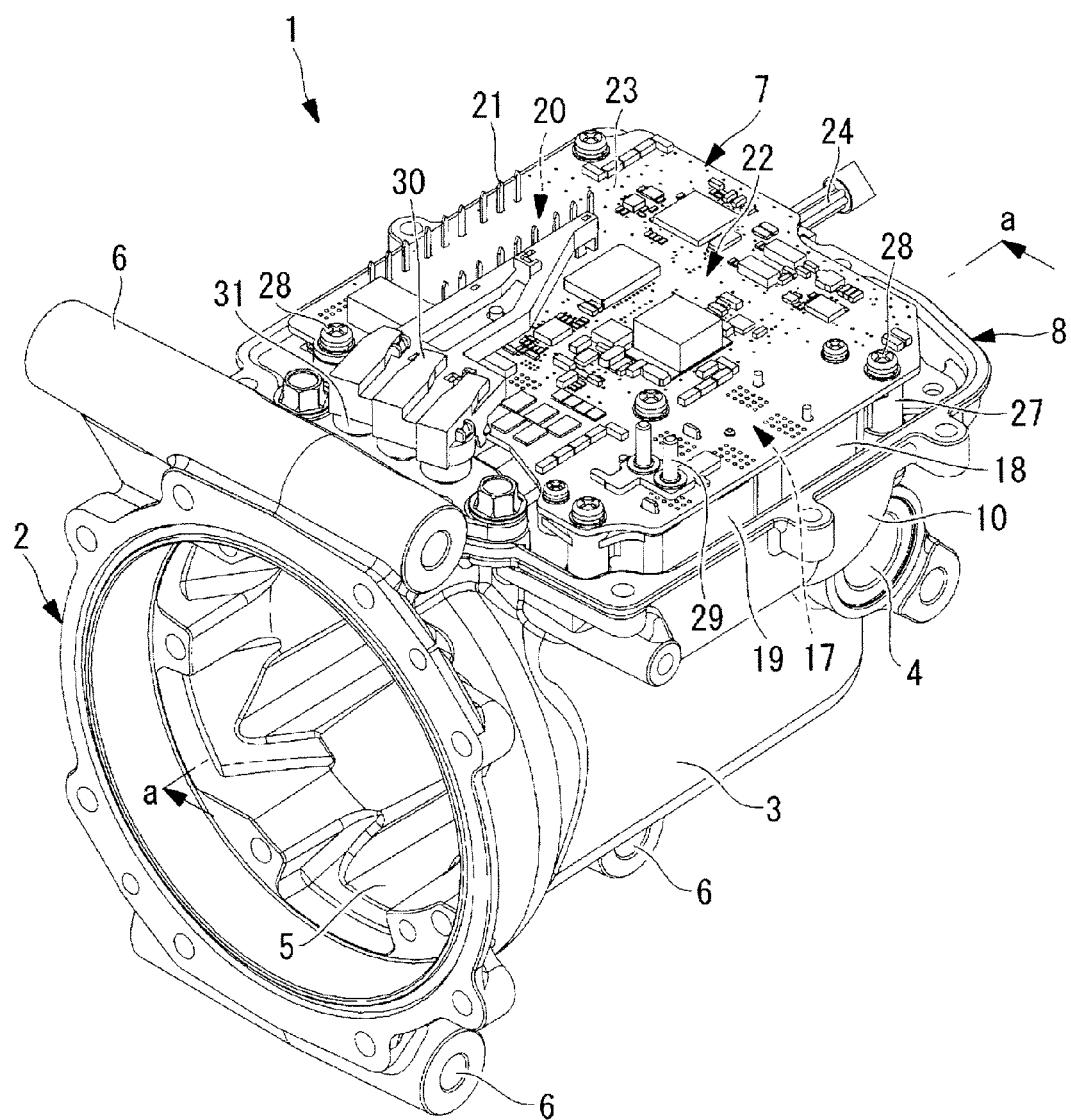
FIG. 1 is a perspective view illustrating a configuration of main parts of an inverter-containing electric compressor provided with an inverter circuit board according to an embodiment of the present invention.
Figure 2:
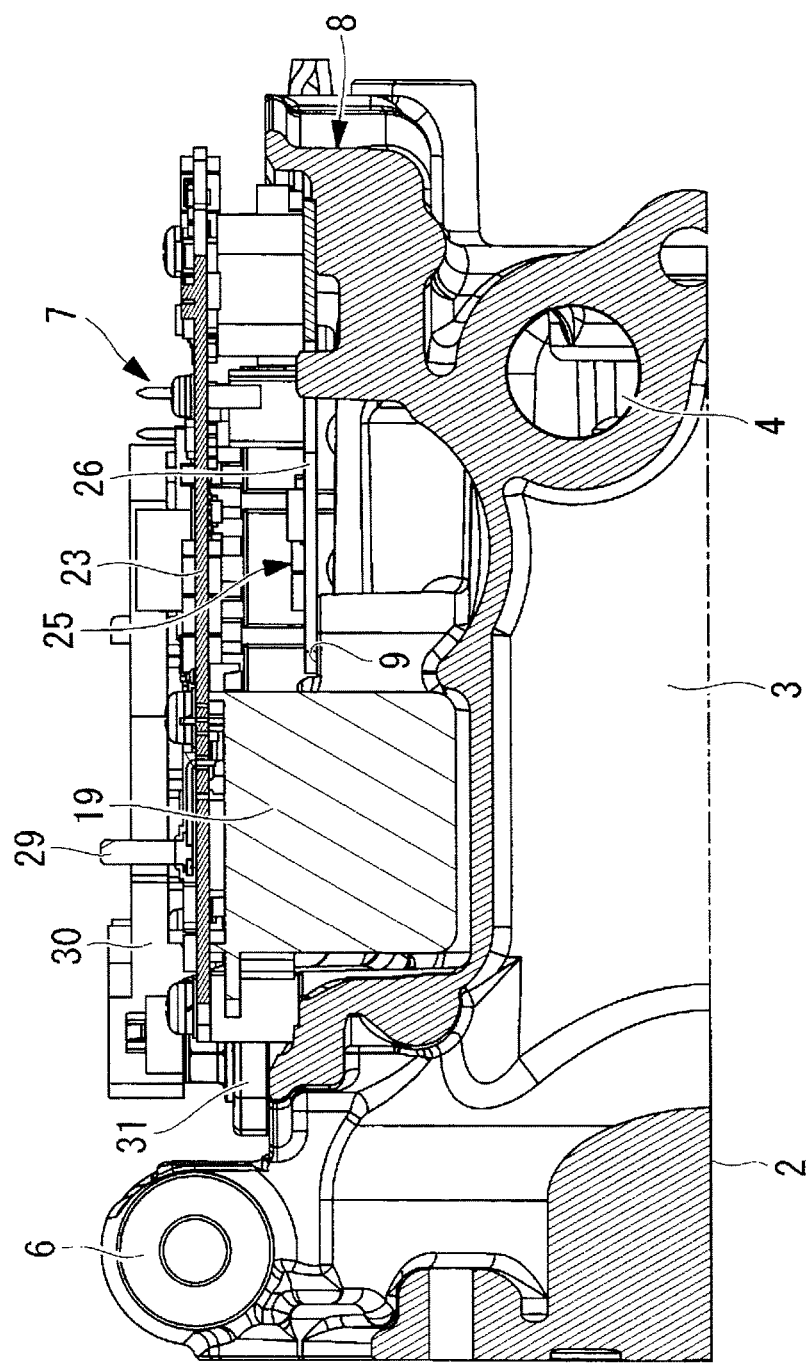
FIG. 2 is a longitudinal sectional diagram along a-a in FIG. 1.
Figure 3:
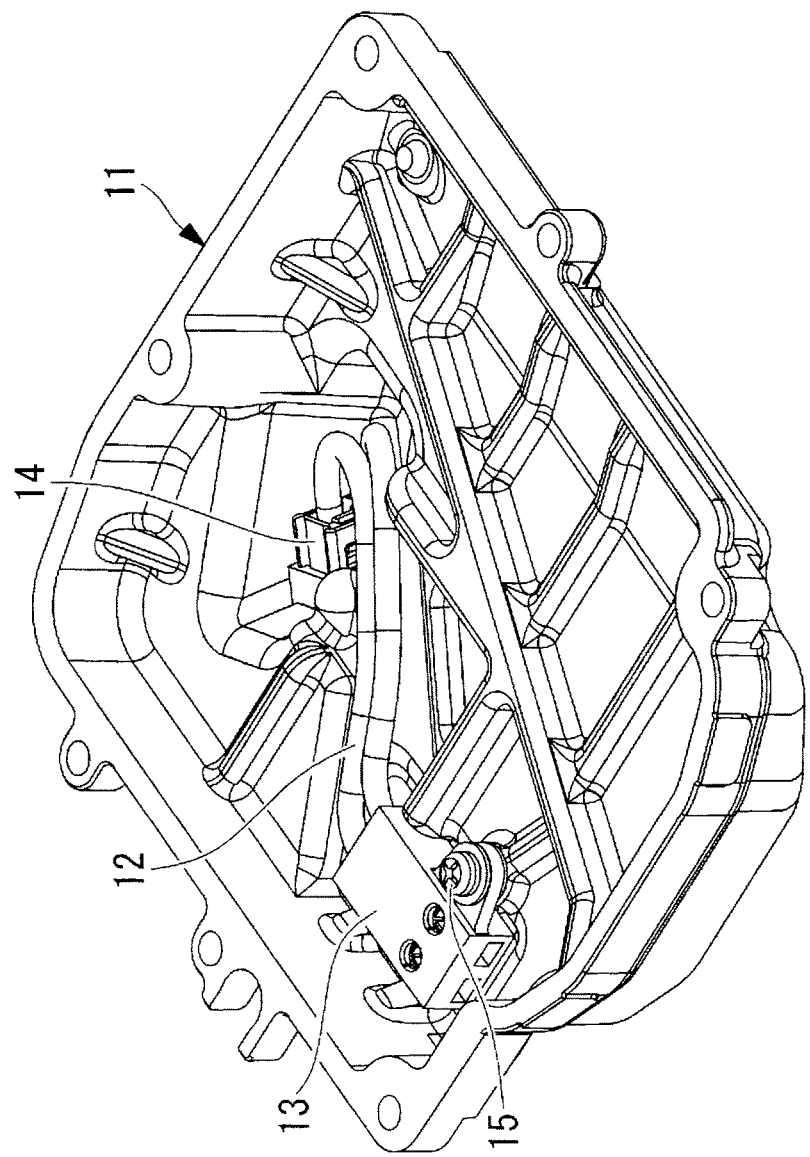
FIG. 3 is a rear surface side perspective view of a cover which seals an inverter housing section of the inverter-containing electric compressor illustrated in FIG. 1.
Figure 4:
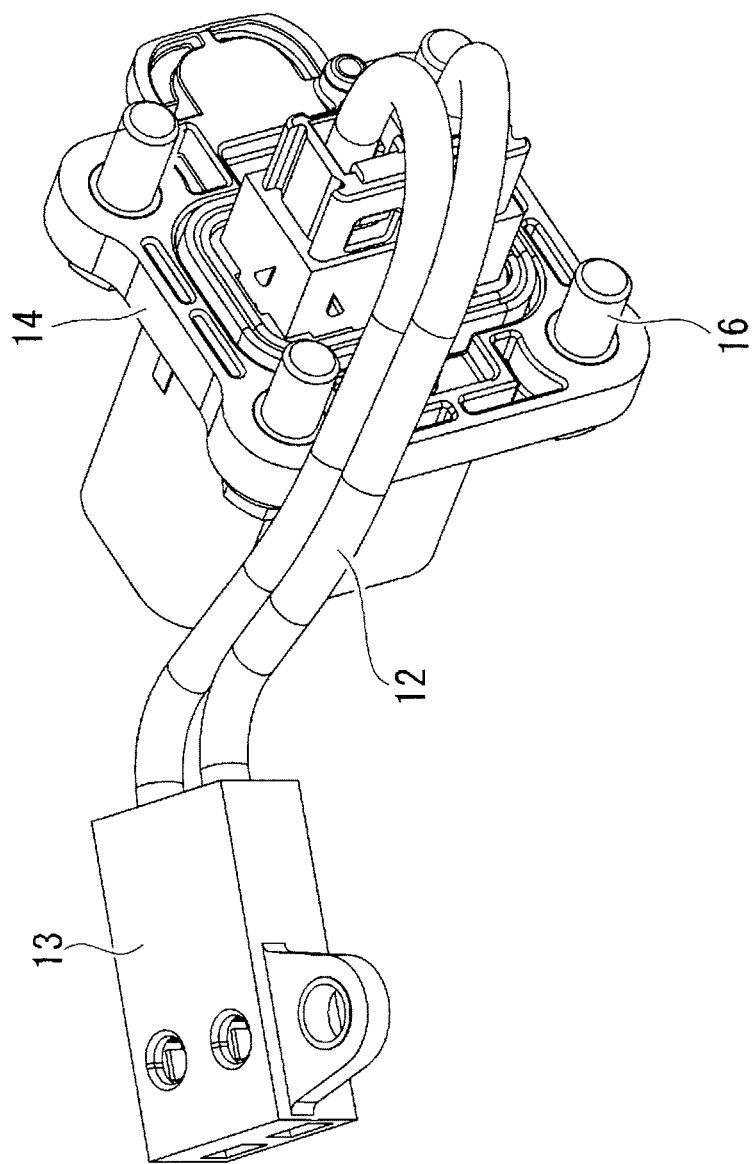
FIG. 4 is a perspective view of a single power source cable connected with the cover illustrated in FIG. 3.
Figure 5:
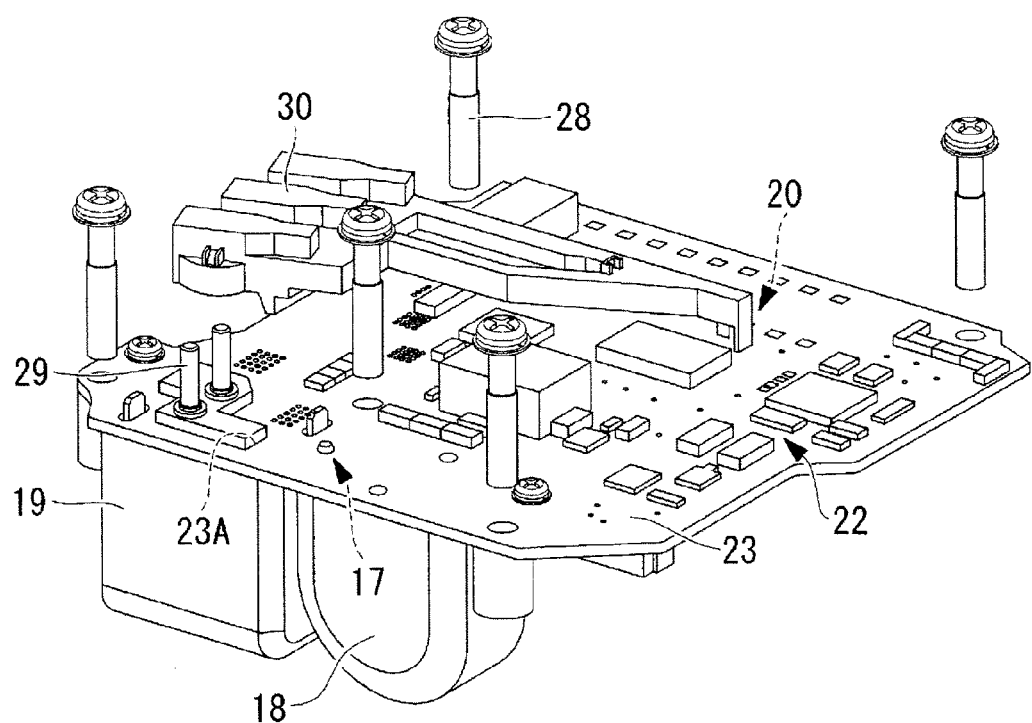
FIG. 5 is a perspective view of the inverter circuit board illustrated in FIG. 1.
Figure 6:
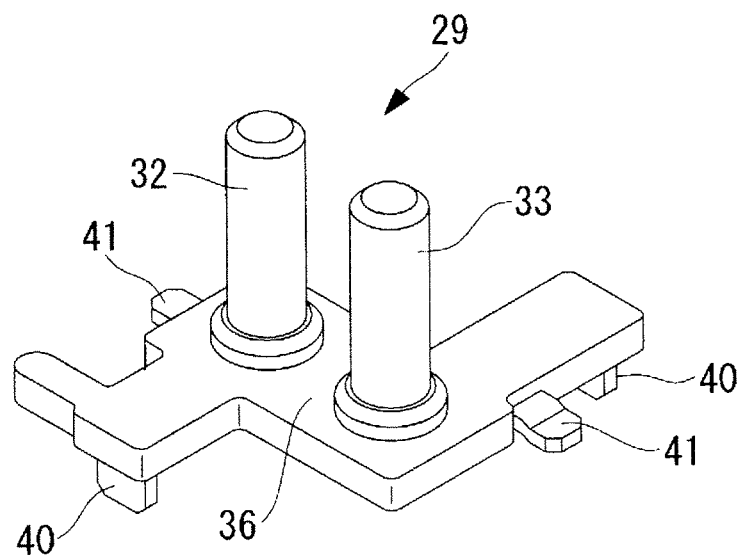
FIG. 6 is a perspective view of a single P-N terminal provided on the inverter circuit board illustrated in FIG. 5.
Figure 7:
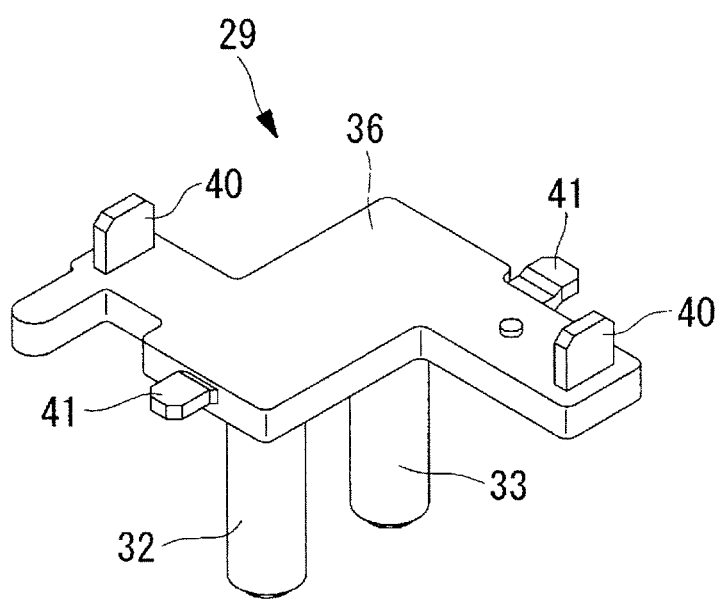
FIG. 7 is a rear surface side perspective view of the P-N terminal illustrated in FIG. 6.
Figure 8:
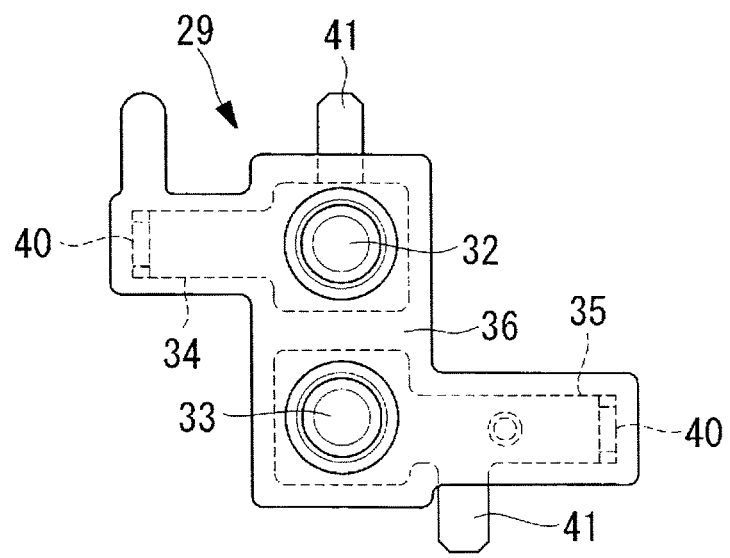
FIG. 8 is a planar diagram of the P-N terminal illustrated in FIG. 6.
Figure 9:
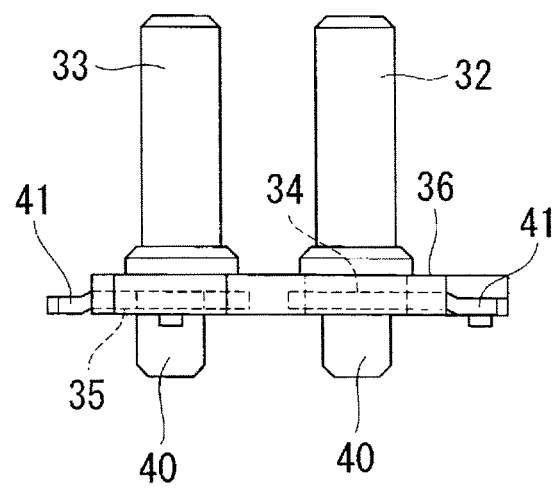
FIG. 9 is a surface diagram of the right side in FIG. 8 of the P-N terminal illustrated in FIG. 6.
Figure 10:
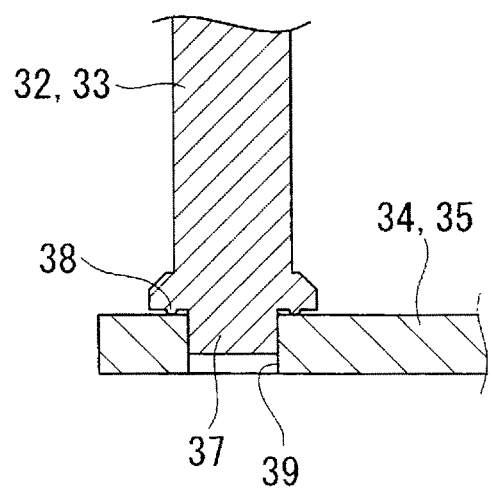
FIG. 10 is a cross-sectional view of a joint portion between a pin and a busbar of the P-N terminal illustrated in FIG. 6.

FIG. 1 illustrates a perspective view of main parts of an inverter-containing electric compressor provided with an inverter circuit board according to an embodiment of the present invention. FIG. 2 is a longitudinal sectional diagram along a-a in FIG. 1. FIG. 3 is a rear surface side perspective view of a cover which seals an inverter housing section. FIG. 4 is a perspective view of a single power source cable. FIG. 5 is a perspective view of the inverter circuit board.

An inverter-containing electric compressor 1 is provided with a cylindrical housing 2 constituting an outer shell. The housing 2 is formed by integrally joining an aluminum die cast motor housing 3 with a built-in electric motor (not illustrated) and an aluminum die cast compressor housing (not illustrated) with a built-in compressor mechanism (not illustrated).

The inverter-containing electric compressor 1 has a configuration where the electric motor and compression mechanism built in the housing 2 are linked through a rotary shaft. The compression mechanism is driven by the electric motor being rotationally driven via an inverter device 7 described below. A low-pressure refrigerant gas drawn into the interior of the motor housing 3 via an intake port 4 disposed in the side wall on the rear end side of the motor housing 3 is drawn in via the periphery of the electric motor, compressed to a high pressure by the compressor mechanism, discharged in the compressor housing, and then sent outside.

The motor housing 3 has a plurality of refrigerant flow paths 5 formed therein to allow refrigerant to flow in the axial direction along the inner circumferential surface thereof, and legs 6 for mounting the electric compressor 1 provided at a plurality of places on the outer circumference thereof. An inverter housing section 8 for integrally incorporating the inverter device 7 is also integrally formed on the outer circumference of the housing 2 (on the motor housing 3 side). The inverter housing section 8 has a substantially square shape in plan view and is configured to have a substantially flat base surface 9 in a portion thereof formed by a wall surface of the motor housing 3 with a cylindrical bottom surface, and configured to have a flange section 10 which is raised at the periphery.

The inverter housing section 8 is configured to be sealed by attaching a cover 11 illustrated in FIG. 3 to the flange section 10 after incorporating the inverter device 7. A high-voltage cable (power source cable) 12 is provided on the inner surface side of the cover 11. As illustrated in FIG. 4, a high-voltage cable 12 is provided with a connector 13 at one end side and a connector terminal 14 connected with the cable on the power source side at the other end side. The connector 13 at the one end of the high-voltage cable 12 is fixed and attached by a screw 15 to an inner surface of the cover 11 at a position corresponding to a P-N terminal 29 provided on an inverter circuit board 23 described below. The connector terminal 14 at the other end of the high-voltage cable 12 is fixed and attached by a plurality of screws 16 from the outer surface side in a state where a terminal portion protrudes to the outer surface side of the cover 11.

The high-voltage cable 12 forms a part of the power source cable and is connected with a power source unit installed in a vehicle via the power source cable. The high-voltage cable 12 is for inputting high-voltage DC power supplied from the power source unit to the inverter device 7 by the connector 13 provided at one end thereof being connected with the P-N terminal 29 provided on the inverter circuit board 23 of the inverter device 7.

As is known, the inverter device 7 converts high-voltage DC power fed from the power source unit installed in the vehicle to three-phase AC power at a required frequency based on an instruction from the host control apparatus, applies the AC power to the electric motor, and drives the electric motor to rotate. As illustrated in FIG. 1 and FIG. 2, the inverter device 7 is integrally incorporated with respect to the inverter housing section 8 provided on the periphery of the housing 2.

The inverter device 7 is formed by a plurality of high-voltage electrical components (also simply referred to as electrical components) such as a coil 18 and a condenser 19 which constitute a known noise removal filter circuit 17, a plurality of (six) semiconductor switching elements 21 formed of heat generating power transistors such as IGBTs constituting a known switching circuit 20 which converts DC power to three-phase AC power, the rectangular inverter circuit board 23 on which an inverter circuit including the filter circuit 17 and the switching circuit 20 and a control circuit (hereinafter, simply referred to as an inverter circuit) 22 including a microcomputer or the like for controlling the inverter circuit are mounted, a sub-circuit board 26 provided with a communication circuit 25 connected with a communication line 24 from a host control apparatus, and the like.

The inverter device 7 may be known; however, here, as the inverter circuit board 23, an inverter circuit board is used on which electrical components such as the coil 18 and the condenser 19 constituting the filter circuit 17 are mounted by soldering the lead terminals thereof, and on which a plurality of (six) semiconductor switching elements 21 (the element main bodies are omitted from the drawings and only the lead terminals thereof are illustrated) formed of heat generating power transistors such as IGBTs constituting the switching circuit 20 are mounted by soldering the lead terminals thereof (each IGBT has three lead terminals to make a total of 18).

That is, in the inverter circuit board 23, the filter circuit 17 and the switching circuit 20 are formed on the inverter circuit board 23 by passing each of the lead terminals of the coil 18 and the condenser 19 constituting the filter circuit 17 and the lead terminals of the plurality of semiconductor switching elements 21 constituting the switching circuit 20 through respective through-holes in the inverter circuit board 23, and mounting these lead terminals on the circuit board by soldering in a pattern. The inverter circuit board 23 is fastened to boss parts 27 formed at four corners in the inverter housing section 8 using screws 28.

As illustrated in FIG. 5, the coil 18 and the condenser 19 which are a plurality of high-voltage electrical components constituting the filter circuit 17 are configured to be housed in a case and the upper surface is formed with a flat planar shape. The coil 18 and the condenser 19 for which the case upper surface is formed with a flat planar shape are mounted so as to be disposed parallel along one side so as to contact a lower surface of the inverter circuit board 23 for which the case upper surface is formed in a rectangular shape. On the upper surface side of a portion corresponding to the inverter circuit board 23 supported on the upper surface of the condenser 19, the P-N terminal 29 for inputting DC power from the power source to the inverter device 7 by being connected with the connector 13 of the high-voltage cable 12 is configured to be upright and face upward.

In addition, the plurality of (six) semiconductor switching elements 21 are configured to be mounted along the other side opposing the one side on which the coil 18 and the condenser 19 constituting the filter circuit 17 are mounted, and to be cooled by heat generated by the attached members being radiated to the wall surface of the motor housing 3 constituting the inverter housing section 8. As illustrated in FIG. 2, the sub-circuit board 26 provided with a communication circuit 25 is fixed and attached onto a plurality of boss parts provided on the base surface 9 in the space between the semiconductor switching element 21 and the attachment positions of the coil 18 and the condenser 19. The sub-circuit board 26 and the inverter circuit board 23 attached above the sub-circuit board 26 are electrically connected via an inter-circuit board connection terminal.

In addition to the filter circuit 17, the switching circuit 20, and the inverter circuit 22, the P-N terminal 29 for inputting DC power from the power source cable 12 to the filter circuit 17 for noise removal, and a UVW terminal 30 for outputting three-phase AC power at a required frequency returned from DC power by the inverter device 7 to the electric motor side are provided on the inverter circuit board 23. The UVW terminal 30 is connected with a glass sealing terminal 31 attached passing through the motor housing 3 in the inverter housing section 8 and applies three-phase AC power to the electric motor built in the motor housing 3 via the glass sealing terminal 31.

The power source cable 12 is connected with the P-N terminal 29 by inserting the connector 13 provided on the cover 11 side; however, a constant pushing force or greater is necessary when inserting the connector 13 and the resulting stress is applied to the P-N terminal 29 and the inverter circuit board 23. In addition, to detach the power source cable 12 by disconnecting the inserted connector 13, a corresponding pulling force is necessary, and the resulting stress is applied to the P-N terminal 29 and the inverter circuit board 23.

In the present embodiment, in order to receive the stress applied to the inverter circuit board 23, the condenser 19 (or the coil 18), which is one of the high-voltage electrical components, is configured to be arranged on the rear surface side of the inverter circuit board 23 to correspond to the position at which the P-N terminal 29 is attached so as to receive the stress applied to the inverter circuit board 23 at the upper surface which is the opposite surface thereto. Since the condenser 19 is configured to be attached to a bottom surface of the inverter housing section 8 in a state of being electrically and mechanically connected with the inverter circuit board 23 and fixed via an adhesive, it is possible to sufficiently support the stress described above.

Meanwhile, with respect to the pulling force when disconnecting the connector 13, it is possible to secure a pulling force and to distribute the stress applied to the inverter circuit board 23 by attaching the P-N terminal 29 as follows.

As illustrated in FIG. 6 to FIG. 10, the P-N terminal 29 itself is integrally formed by resin molding using a resin molded member 36 by welding the lower ends of a pair of pins 32 and 33 in a state of being perpendicular to one end side of the busbars 34 and 35 of a prescribed length, placing the other end sides of the busbars 34 and 35 in parallel and facing in opposite directions to each other, and setting specified dimensions between the pair of pins 32 and 33.

The pair of pins 32 and 33 are integrally formed by being provided with a protrusion 37 and a plurality of projections 38 on lower ends thereof, the protrusions 37 being aligned to fit into holes 39 provided on the side of the busbars 34 and 35, and each of the busbars 34 and 35 being resistance-welded (projection-welded) using the protrusions 37 and the plurality of projections 38. In addition, the pair of busbars 34 and 35 are provided with through-hole terminals 40 extending downward from other end positions (farthest positions) as far as possible from the pins 32 and 32 on the bottom surfaces thereof and soldered by being inserted into through-holes 23A of the inverter circuit board 23, and surface-mounting terminals 41 provided at positions close to each of the pins 32 and 33 and soldered on the surface of the inverter circuit board 23.

The P-N terminal 29 described above is fixed and attached at the positions described above on the inverter circuit board 23 by a pair of the through-hole terminals 40 provided in each of the busbars 34 and 35 being soldered after being inserted into the through-holes 23A of the inverter circuit board 23 and a pair of the surface-mounting terminals 41 being soldered on the surface of the inverter circuit board 23. Here, the P-N terminal 29 may be reinforced not only by being soldered using the through-hole terminals 40 and the surface-mounting terminals 41, but also by adhering the bottom surface of the resin molded member 36 to the circuit board surface with an adhesive.

As described above, with respect to the P-N terminal 29 attached onto the inverter circuit board 23 on which the inverter circuit 22 is mounted, even when stress caused by an excessive pushing force is applied to the inverter circuit board 23 when inserting the connector 13 into the P-N terminal 29, it is possible to receive this stress using the existing electrical components by arranging the condenser 19, which is one of the electrical components constituting the filter circuit 17 of the inverter device 7, at a position on the opposite side to the P-N terminal 29 with the inverter circuit board 23 therebetween. For this reason, it is possible to reliably eliminate the risk of damaging the inverter circuit board 23 or the electrical components with the stress caused by pushing force when inserting the connector 13 into the P-N terminal 29.

In addition, it is possible to firmly fix and attach the P-N terminal 29 on the inverter circuit board 23 by soldering the through-hole terminals 40 provided at positions as far as possible from each of the pins 32 and 33 and the surface-mounting terminals 41 provided at positions close to each of the pins 32 and 33. Thus, even in a case of a configuration where the power source cable 12 is directly connected by inserting the connector 13 into the P-N terminal 29, not only is it possible to stably hold the P-N terminal 29 on the inverter circuit board 23 and smoothly insert the connector 13, but it is also possible to secure a sufficient pulling strength with respect to the disconnection force and prevent the P-N terminal 29 from being detached when detaching the power source cable 12 by disconnecting the connector 13 from the P-N terminal 29 during maintenance.

Thus, according to the present embodiment, the P-N terminal 29 fixed and attached on the inverter circuit board 23 is configured to be provided with the pair of pins 32 and 33, the busbars 34 and 35 of a prescribed length joined to be perpendicular with each of one ends of the pins 32 and 33, the resin molded member 36 formed integrally with the pair of pins 32 and 33 and busbars 34 and 35, the through-hole terminals 40 provided in the pair of busbars 34 and 35 and soldered after being inserted into the through-holes 23A of the inverter circuit board 23, and the surface-mounting terminals 41 soldered to the circuit board surface of the inverter circuit board 23, and configured to be fixed and attached on the circuit board 23 by soldering the through-hole terminals 40 and the surface-mounting terminals 41 at the inverter circuit board 23 side.

For this reason, the pair of busbars 34 and 35 of the P-N terminal 29 are soldered via the through-hole terminals 40 and the surface-mounting terminals 41 and firmly fixed and attached to the resin molded member 36 and the inverter circuit board 23. Accordingly, even in a case of a configuration where the power source cable 12 is directly connected by inserting the connector 13 into the P-N terminal 29, it is possible to stably hold the P-N terminal 29 on the inverter circuit board 23 and to connect the power source cable 12 by smoothly inserting the connector 13.

In addition, even when the power source cable 12 is detached by disconnecting the connector 13 from the P-N terminal 29 for maintenance, it is possible to secure a sufficient pulling strength with respect to the disconnection force and to prevent the P-N terminal 29 from being detached from the inverter circuit board 23. In addition, by soldering the P-N terminal 29 at each of two places, it is possible to secure a sufficient current density with respect to the input of high voltages.

In addition, the through-hole terminals 40 are provided at the positions as far as possible from each of the pins 32 and 33 and the surface-mounting terminals 41 are provided at positions close to each of the pins 32 and 33. Thus, since the soldering is performed with respect to the inverter circuit board 23 of the P-N terminal 29 at two places which are the positions as far as possible sufficiently separated from the pair of pins 32 and 33 and the positions close to each of the pins 32 and 33, it is possible to distribute the stress applied to the inverter circuit board 23 side within as wide a range as possible when attaching and detaching the connector 13 of the power source cable 12 to and from the P-N terminal 29. Accordingly, not only is it possible to attach the P-N terminal 29 while securing strength sufficient to withstand the force applied when inserting or disconnecting the connector 13, but it is also possible to reduce the stress applied to the inverter circuit board 23 and carry out the attachment in a state where the stability of the posture is maintained.

In addition, since the pins 32 and 33 and the busbars 34 and 35 of the P-N terminal 29 are configured to be resistance-welded using the protrusions 37 and the plurality of projections 38 fitting into the holes 39 on the side of the busbars 34 and 35 provided on one end surface of the pins 32 and 33, in a state where the protrusions 37 of each of the pins 32 and 33 are aligned to be fitted in holes 39 on the side of each of the busbars 34 and 35, it is possible for each of the pins to be integrated with each of the busbars by resistance-welding using the protrusions 37 and the plurality of projections 38. Accordingly, each of the pins 32 and 33 is welded with high precision at right angles with respect to each of the busbars 34 and 35, and it is possible to facilitate the attachment and detachment of the connector 13 by increasing the precision in the P-N terminals 29.

Furthermore, in the present embodiment, in the inverter-containing electric compressor 1 which is integrated by the inverter device 7 being incorporated in the inverter housing section 8 which is provided in the housing 2, the inverter device 7 is provided with the inverter circuit board 23 described above, and is configured to be able to connect with the power source cable 12 by inserting the connector 13 provided on one end of the power source cable 12 supplying DC power to the inverter device 7 into the P-N terminal 29 provided on the inverter circuit board 23.

For this reason, it is possible to directly connect the power source cable 12 with the inverter circuit board 23 by inserting the connector 13 of the power source cable 12 into the P-N terminal 29 fixed and attached onto the inverter circuit board 23. Even in the case of this configuration, it is possible to easily connect and disconnect the power source cable 12 by plugging in or withdrawing the connector 13 since the P-N terminal 29 is firmly fixed and attached. Accordingly, it is possible to facilitate the attachment and detachment of the power source cable 12 during maintenance, and it is possible to simplify the configuration of the input system of the inverter device 7, and to lower the costs and reduce the size and weight of the inverter device 7.

In addition, in this configuration, stress applied to the inverter circuit board 23 when inserting the connector 13 is received by the coil 18 and the condenser 19 constituting the filter circuit 17 for noise removal being mounted on the inverter circuit board 23 described above, and either one of these being attached to the rear surface side corresponding to the attachment position of the P-N terminal 29 provided on the inverter circuit board 23. For this reason, even in a case of a configuration where the power source cable 12 is directly connected by inserting the connector 13 into the P-N terminal 29 on the inverter circuit board 23, it is possible to reduce the stress applied to the inverter circuit board 23 when inserting the connector 13 by receiving the stress with the coil 18 or the condenser 19 provided on the rear surface side of the inverter circuit board 23.

Due to this, it is possible to reliably eliminate situations where the inverter circuit board 23 or any components mounted thereon are damaged by the stress caused by an excessive pushing force when inserting the connector 13, and it is possible to simplify the configuration of the DC power input system, and to lower the costs and reduce the size and weight of the inverter device 7.

Furthermore, the connector 13 provided at one end of the power source cable 12 is provided at a position corresponding to the P-N terminal 29 on the cover 11 side sealing the inverter housing section 8 and is configured to be able to be inserted into the P-N terminal 29 when attaching the cover 11. It is possible to connect the power source cable 12 to the P-N terminal 29 of the inverter device 7 by inserting the connector 13 attached to the inner surface of the cover 11 into the P-N terminal 29 at the same time as when sealing the inverter housing section 8 by attaching the cover 11 after housing and attaching the inverter device 7.

Accordingly, it is possible to simplify the connection structure and the connection process of the power source cable 12, and, even when the connector 13 is fitted by pushing the cover 11 with a somewhat excessive force, excessive stress is not applied to the inverter circuit board 23 and it is possible to reliably insert the connector 13 into the P-N terminal.

Note that the present invention is not limited to the invention according to the embodiment as described above, and changes can be made as appropriate without departing from the gist thereof. For example, in the embodiment described above, the P-N terminal 29 attached to the upper surface of the inverter circuit board 23 is configured to be attached at a position on the upper section of the condenser 19; however, the P-N terminal 29 may be configured to be attached at a position on the upper section of the coil 18. In addition, description was given of the P-N terminal 29 using an example where busbars 34 and 35 joined with the pair of pins 32 and 33 are formed in a crank shape using the resin molded member 36; however, the present invention is not limited to such a shape and may be configured by being integrally formed into another shape.

REFERENCE SIGNS LIST

1 Inverter-containing electric compressor
2 Housing
3 Motor housing
7 Inverter device
8 Inverter housing section
11 Cover
12 High-voltage cable (power source cable)
13 Connector
17 Filter circuit
18 Coil
19 Condenser
22 Inverter circuit
23 Inverter circuit board
23A Through-hole
29 P-N terminal
32, 33 Pin
34, 35 Busbar
36 Resin molded member
37 Protrusion
38 Projection
39 Hole
40 Through-hole terminal
41 Surface-mounting terminal

The invention claimed is:

1. An inverter circuit board comprising:
a circuit board;
an inverter circuit mounted on the circuit board;
a P-N terminal via which high-voltage DC power is inputted attached to the circuit board; and
a connector on a power cable of a power source directly connected to the P-N terminal so as to be able to be freely attached and detached,
the P-N terminal being provided with:
a pair of pins;
a pair of busbars of a prescribed length respectively joined perpendicularly to one ends of each of the pair of pins, the pair of busbars being provided with through-hole terminals attached on the circuit board by being inserted into and soldered to through-holes in the circuit board, and surface-mounting terminals attached on the circuit board by being soldered to the surface of the circuit board; and
a resin molded member formed integrally with the pair of pins and the pair of busbars.

2. The inverter circuit board according to claim 1, wherein the through-hole terminals are respectively provided at positions as far as possible from the pair of pins and the surface-mounting terminals are respectively provided at positions close to the pair of pins.

3. The inverter circuit board according to claim 1, wherein the pair of pins and the pair of busbars are resistance-welded using protrusions and a plurality of projections which are provided on one end surfaces of the pair of pins and fitted in holes on the pair of busbars.

4. An inverter-containing electric compressor which is integrated by an inverter device being assembled in an inverter housing section which is provided at a periphery of a housing, wherein
the inverter device is provided with the inverter circuit board described in claim 1, and a power source cable is able to be connected by inserting the connector, which is provided at one end of the power source cable which supplies DC power to the inverter device, into the P-N terminal which are provided on the inverter circuit board.

5. The inverter-containing electric compressor according to claim 4, wherein a coil and a condenser which constitute a filter circuit for removing noise are mounted on the inverter circuit board, and either one of the coil and condenser receives stress, which is applied to the inverter circuit board when the connector is inserted, by being attached to a rear surface side of the inverter circuit board to correspond to an attachment position of the P-N terminal provided on the inverter circuit board.

6. The inverter-containing electric compressor according to claim 4, wherein the connector provided on one end of the power source cable is provided at a position which corresponds to the P-N terminal on a side of a cover which seals the inverter housing section, and is able to be inserted into the P-N terminal when attaching the cover.

* * * * *